United States Patent
Otosaka

(10) Patent No.: US 10,472,270 B2
(45) Date of Patent: Nov. 12, 2019

(54) POROUS GLASS BASE MATERIAL SINTERING METHOD AND SINTERING APPARATUS

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 15/099,616

(22) Filed: Apr. 15, 2016

(65) Prior Publication Data
US 2016/0304388 A1 Oct. 20, 2016

(30) Foreign Application Priority Data
Apr. 20, 2015 (JP) .................. 2015-085603

(51) Int. Cl.
*C03B 37/025* (2006.01)
*C03B 37/029* (2006.01)
(Continued)

(52) U.S. Cl.
CPC ...... *C03B 37/0142* (2013.01); *C03B 2201/02* (2013.01)

(58) Field of Classification Search
CPC . C03B 37/025; C03B 37/0253; C03B 37/029; C03B 37/10853; C03B 37/01861;
(Continued)

(56) References Cited

U.S. PATENT DOCUMENTS 6,289,698 B1* 9/2001 Antos .................. C03B 32/00
   65/111
6,386,001 B1* 5/2002 Shimizu ............. C03B 23/047
   65/377
(Continued)

FOREIGN PATENT DOCUMENTS

| JP | 2003-81642 A | 3/2003 |
| JP | 2005-8452 A | 1/2005 |
| JP | 2007070168 A | 3/2007 |

OTHER PUBLICATIONS

English language human translation of Tadakatsu (JP 2005-008452).*

(Continued)

*Primary Examiner* — Jason L Lazorcik

(57) ABSTRACT

A porous glass base material sintering method comprising measuring a feeding speed $V_f$ of a porous glass base material and a movement speed $V_w$ of a bottom end of the glass base material; performing a sintering treatment of the porous glass base material presetting, for each feeding distance L of the porous glass base material, a greater-than-1 target value $\alpha_S$ (L) of an elongation rate in a straight body portion of the porous glass base material calculated based on a ratio $V_w/V_f$, and controlling at least one of a temperature of the heating furnace and a feeding speed of the porous glass base material such that a measured value $\alpha$ of the elongation rate of the porous glass base material matches with the target value $\alpha_S$ (L).

8 Claims, 8 Drawing Sheets

(51) Int. Cl.
*C03B 37/03* (2006.01)
*C03B 37/014* (2006.01)

(58) Field of Classification Search
CPC ............ C03B 2205/40; C03B 2205/44; C03B 2205/72
See application file for complete search history.

(56) References Cited

U.S. PATENT DOCUMENTS

| | | | | |
|---|---|---|---|---|
| 6,742,363 | B1* | 6/2004 | Yamamura | C03B 23/047 65/377 |
| 7,458,234 | B2* | 12/2008 | Yamamura | C03B 37/01466 385/123 |
| 9,862,635 | B2* | 1/2018 | Otosaka | C03B 37/07 |
| 2006/0115913 | A1* | 6/2006 | Orita | C03B 37/01446 438/22 |
| 2006/0130524 | A1* | 6/2006 | Hovinen | C03B 37/01257 65/32.5 |
| 2007/0271961 | A1* | 11/2007 | Inoue | C03B 37/01486 65/377 |
| 2013/0291601 | A1* | 11/2013 | Otosaka | C03B 37/0124 65/377 |
| 2016/0139062 | A1* | 5/2016 | Faraldi | C03B 37/025 65/378 |

OTHER PUBLICATIONS

English language human translation of Tomoyuki (JP 2003-081642).*
Office Action issued for counterpart Japanese Application 2015-085603, issued by the Japan Patent Office dated Apr. 18, 2018.

* cited by examiner

POROUS GLASS BASE MATERIAL SINTERING METHOD AND SINTERING APPARATUS

The contents of the following Japanese patent application are incorporated herein by reference:

NO. 2015-085603 filed on Apr. 20, 2015.

BACKGROUND

1. Technical Field

The present invention relates to a porous glass base material sintering method and sintering apparatus.

2. Related Art

A method for a transparent glass by sintering suppressing an outer diameter variation of a porous glass base material has been proposed (for example, refer to Patent Document 2).

Patent Document 1: Japanese Patent Application Publication No. 2003-081642

Patent Document 2: Japanese Patent Application Publication No. 2005-008452

SUMMARY

Methods for manufacturing an optical fiber base material having a slight diameter variation without increasing the number of processes have been searched.

According to a first aspect of the present invention, provided is a porous glass base material sintering method for making a transparent glass moving relatively to a heating furnace a hung-down porous glass base material and heating the porous glass base material sequentially from one end to the other end. The method comprises measuring a feeding speed $V_f$ of the porous glass base material and a movement speed $V_w$ of a bottom end of the glass base material; performing a sintering treatment of the porous glass base material presetting, for each feeding distance L of the porous glass base material, a greater-than-1 target value $\alpha_S(L)$ of an elongation rate in a straight body portion of the porous glass base material calculated based on a ratio $V_w/V_f$, and controlling at least one of a temperature of the heating furnace and the feeding speed of the porous glass base material such that a measured value $\alpha$ of the elongation rate of the porous glass base material matches with the target value $\alpha_S(L)$.

According to a second aspect of the present invention, provided is a porous glass base material sintering apparatus for making a transparent glass moving relatively to a heating furnace a hung-down porous glass base material and heating the porous glass base material sequentially from one end to the other end. The apparatus comprises a control portion which measures, when sintering the porous glass base material, a feeding speed $V_f$ of the porous glass base material and a movement speed $V_w$ of a bottom end of the glass base material, presets, for each feeding distance L of the porous glass base material, a greater-than-1 target value $\alpha_S(L)$ of an elongation rate in a straight body portion of the porous glass base material calculated based on a ratio $V_w/V_f$, and controls at least one of a temperature of the heating furnace and the feeding speed of the porous glass base material such that a measured value $\alpha$ of the elongation rate of the porous glass base material matches with the target value $\alpha_S(L)$.

The above-described invention summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
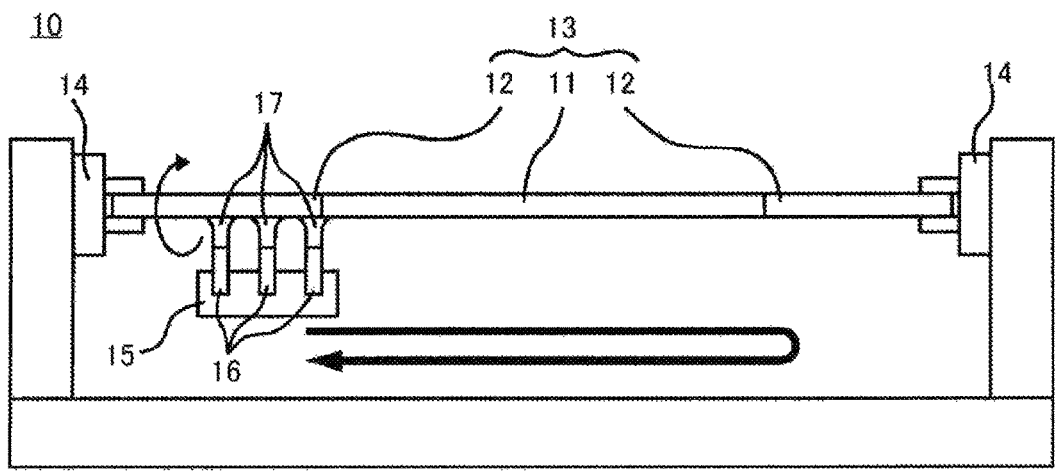
FIG. 1 shows a schematic view of a glass lathe 10.

FIG. 1 shows a schematic view of a glass lathe 10 which can manufacture a porous glass base material being a sintering subject. The glass lathe 10 comprises one pair of rotary chucks 14 and a plurality of burners 16. The porous glass base material can be manufactured by, for example, OVD method (Outside Vapor Deposition method).

The pair of rotary chucks 14 grip handles 12 which are welded to both ends of a core rod 11 in a target rod 13, and rotate the target rod 13 which is held horizontally. The plurality of burners 16 are mounted to a common burner stand 15 that moves along a longitudinal direction of the target rod 13, and inject flames 17 over an entire length of the core rod 11 of the target rod 13.

Here, to the burners 16, oxygen and hydrogen are supplied in addition to glass raw materials, for example, silicon tetrachloride, trichloro(methyl)silane, octamethylcyclotetrasiloxane, and the like. Accordingly, in the flames 17, glass microparticles are generated by flame hydrolysis reactions. Therefore, by a reciprocating movement of the burner stand 15 along the target rod 13, the glass microparticles generated by the flames 17 adhere to a surface of the target rod 13 that is rotating.

Figure 2:
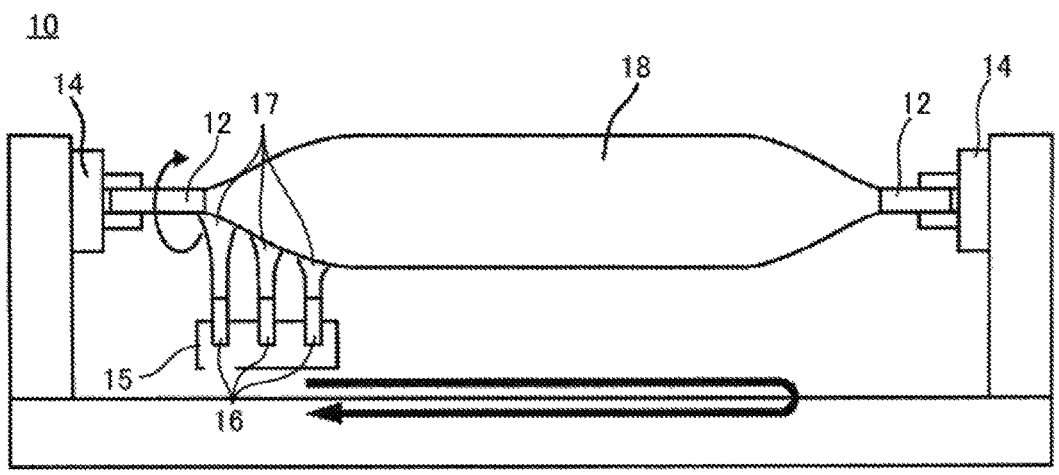
FIG. 2 shows a schematic view describing a porous glass base material manufacturing by the glass lathe 10.

FIG. 2 is a drawing showing a state where the porous glass base material 18 is formed at the glass lathe 10. The glass microparticles adhering to the target rod 13 are deposited in layers. Furthermore, an outer diameter of the porous glass base material 18 is increased due to the continuous deposition of the glass microparticles; thereby, the burner stand 15 is positioned away from the target rod 13, and after a scheduled deposition amount of the glass microparticles is reached, the supply of the raw material gas to the burners 16 is stopped.

In this way, the porous glass base material 18 including the deposited glass microparticles is formed. The porous glass base material 18 becomes a transparent glass sintering by, for example, an electric furnace, and an optical fiber base material for drawing an optical fiber is obtained.

It should be noted that prior to the above-described transparent glass process, a dehydration treatment may be performed to remove impurities such as an OH group from the porous glass base material 18. The dehydration treatment is performed by heating the porous glass base material 18 at a temperature of about 1100° C. in an atmosphere containing dehydrating gas, for example, chlorine, thionyl chloride and the like.

Also, the method for manufacturing the porous glass base material 18 is not limited to OVD method. For example, with VAD method (Vapor phase Axial Deposition method), MCVD method (Modified Chemical Vapor Deposition method), PCVD method (Plasma-enhanced Chemical Vapor Deposition method) and the like, the porous glass base material 18 can be manufactured as well.

Figure 3:
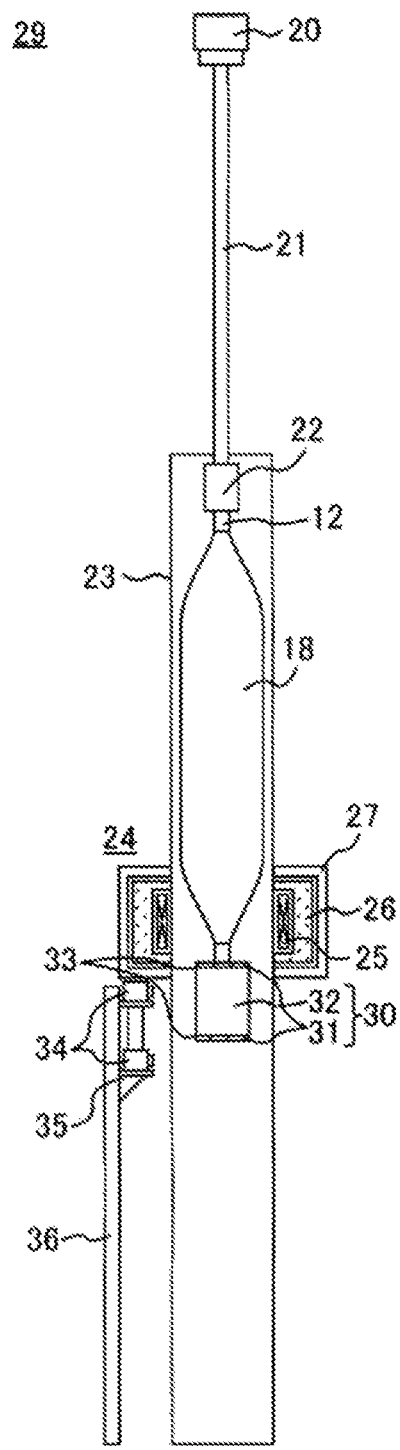
FIG. 3 shows a schematic sectional view of a sintering apparatus 29.

FIG. 3 shows a schematic sectional view of a sintering apparatus 29 that can be used in a case of sintering the porous glass base material 18. The sintering apparatus 29 comprises a carriage 20, a rotary shaft 21, a connection member 22, a furnace core tube 23 and a heating furnace 24.

The furnace core tube 23 can be formed using a transparent quartz glass and has a thickness for housing the porous glass base material 18. In the sintering apparatus 29, the furnace core tube 23 is arranged vertically. The porous glass base material 18 to be sintered by the sintering apparatus 29 is connected to the carriage 20 via the rotary shaft 21 and the connection member 22, and is hung down inside the furnace core tube 23.

The carriage 20 is arranged over the furnace core tube 23 and is driven up and down in the illustrated direction of the drawing in a state of gripping one end of the rotary shaft 21 and hanging the rotary shaft 21 down. The rotary shaft 21 is coupled to the carriage 20 at an upper end in the drawing, and, via the connection member 22 provided at a bottom end, the rotary shaft 21 is connected inside the furnace core tube 23 to the handle 12 which is at an upper side in the drawing in the porous glass base material 18. Accordingly, the porous glass base material 18 moves inside of the furnace core tube 23 up and down in the illustrated direction of the drawing while rotating around the rotary shaft 21 as a rotary axis inside the furnace core tube 23.

The heating furnace 24 is arranged enclosing a part of the furnace core tube 23 in the longitudinal direction, and has a heater 25, a thermal insulation material 26 and a chamber 27. The heater 25 radiates generated heat toward inside the furnace core tube 23 through a tube wall of the furnace core tube 23. Accordingly, the porous glass base material 18 passing through inside the furnace core tube 23 can be heated. The thermal insulation material 26 encloses the heater 25 distally from the furnace core tube 23; thereby, it prevents the heat generated by the heater 25 from being emitted to the outside. The chamber 27 houses the heater 25 and the thermal insulation material 26, and is integrated with the heating furnace 24.

The sintering apparatus 29 further comprises a camera pedestal 35 arranged laterally to the furnace core tube 23 in the drawing. The camera pedestal 35 moves along a slide rail 36 arranged in the longitudinal direction of the furnace core tube 23. Cameras 34 are mounted to the camera pedestal 35. The cameras 34 can continuously photograph and monitor an optical fiber base material 28 inside the furnace core tube 23 from outside the furnace core tube 23 through a transparent furnace wall of the furnace core tube 23.

In a case of sintering the porous glass base material 18 in the sintering apparatus 29, a weight 30 may be attached to a bottom end of the porous glass base material 18. Accordingly, a tension acts on the porous glass base material 18, and the porous glass base material 18 softened by heating is elongated. In the illustrated example, the weight 30 has a quartz glass cylinder 32 which is sandwiched from an upper side and a lower side by one pair of carbon plates 31. In boundaries between the carbon plates 31 and the quartz glass cylinder 32, horizontal marks 33 are formed, which can be observed by the cameras 34. Also, in a case where the porous glass base material 18 becomes a glass near the bottom end, a target elongation rate can be easily achieved even at a comparatively low heating furnace temperature by attaching the weight 30 to the bottom end of the porous glass base material 18. Accordingly, it is possible to prevent a deformation caused by an excessive temperature increase in the furnace core tube 23.

In the sintering apparatus 29, by photographing the marks 33 that can be observed from the side surface of the weight 30 by the cameras 34 that are freely driven in a up-and-down direction, a position of the weight 30 can be accurately calculated based on positions of the marks in a captured image obtained by an image process and positions of the cameras 34 themselves. Further, a movement speed $V_w$ of the weight 30 can be calculated by continuously photographing the weight 30 by the cameras 34.

As already described above, since the weight 30 is attached to the bottom end of the porous glass base material 18, a position and a movement speed of the bottom end of the porous glass base material 18 in the furnace core tube 23 are known according to the position and the movement speed $V_w$ of the weight 30. In this way, by photographing the marks 33 of the weight 30 attached to the porous glass base material 18 by the cameras 34, the sintering apparatus 29 can surely and accurately measure the position and the movement speed $V_w$ of the bottom end of the porous glass base material 18 that is transparent itself and difficult to be photographed.

It should be noted that in the weight 30 in the sintering apparatus 29 shown in the drawings, the carbon plates 31 and the quartz glass cylinder 32, which are two kinds of different materials, are stacked in a vertical direction, and the marks 33 are formed by the boundaries of the materials. Accordingly, it can form the marks 33 which are easy to be visually recognized from the image captured by the cameras 34 without wearing. As a material forming the weight 30, it is preferable to have both heat resistance to the heat inside the furnace core tube 23 and resistance against reactivity so as not to be affected by chlorine or thionyl chloride used in the dehydration process.

Specifically, carbon, silicon nitride, alumina, quartz glass and the like can be exemplified. Also, the side surface of the quartz glass raw material can be sand-blasted. Furthermore, in the above-described raw material, carbon and silicon nitride are dark color materials, and alumina and the sand-blasted quartz glass are white materials. Therefore, by forming the weight 30 combining such a dark color material and a white material, clear boundaries can be obtained and the marks 33 that are easy to be visually recognized can be formed.

Also, a plurality of the marks 33 may be provided spaced apart from each other in a height direction of the weight 30. Accordingly, even if any object that obstructs visual fields of the cameras, such as a connection portion, a holding member and the like, is presented around the furnace core tube 23, any one of the marks 33 can be recognized by the cameras 34. Furthermore, for the similar reason, it is preferable to photograph the plurality of marks 33 respectively by individual cameras 34.

The heating furnace 24 is fixed at about the middle of the height of the furnace core tube 23, and has a height less than the length of the porous glass base material 18. Therefore, the heating furnace 24 cannot heat the entire porous glass base material 18 at one time. In a case where the porous glass base material 18 passes through an inner side of the heating furnace 24, the heating furnace 24 heats the porous glass base material 18 at a temperature about no less than 1500° C.

Figure 4:
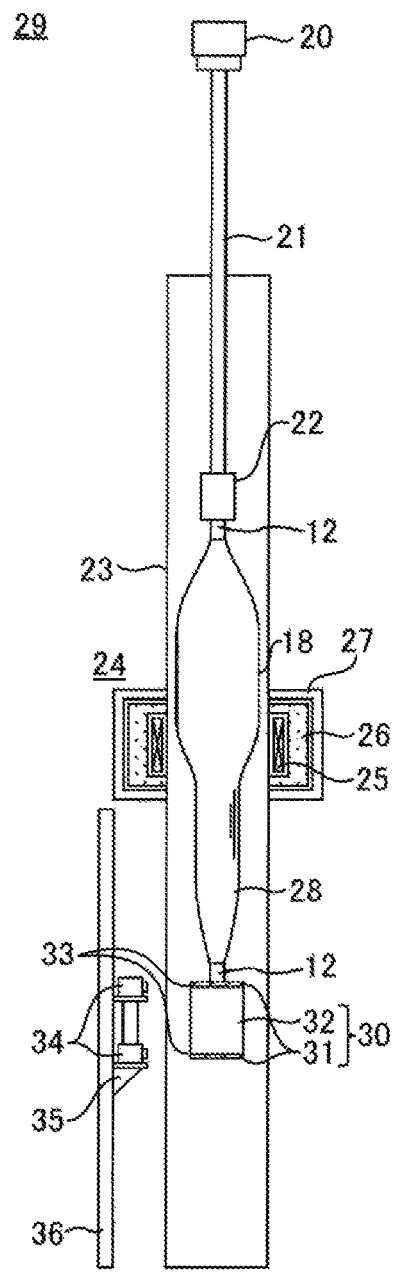
FIG. 4 is a drawing showing a sintering course of a porous glass base material 18 by the sintering apparatus 29.

FIG. 4 is a schematic sectional view showing a sintering course of the porous glass base material 18 by the sintering apparatus 29. In FIG. 4, the same reference numerals are given to the elements common with those in FIG. 3, and the overlapping descriptions are omitted.

When sintering in the sintering apparatus 29, by driving the carriage 20, the porous glass base material 18 to be sintered moves down while rotating inside the furnace core tube 23 filled with the atmosphere gas such as helium and the like. Accordingly, the porous glass base material 18 is sintered by being heated sequentially from the bottom end, and the sintered portion becomes the optical fiber base material 28 being a transparent glass. In the illustrated example, an approximate lower half part of the porous glass base material 18 becomes the optical fiber base material 28 being a transparent glass.

It should be noted that at a point in time when the sintering begins in the sintering apparatus 29, the porous glass base material 18 becomes a transparent glass from a tapered part formed near its bottom end. However, the tapered part is a portion that cannot be a product in a case of drawing an optical fiber. For this reason, at the point in time when the sintering begins to make a glass in the sintering apparatus 29, the monitoring of the marks 33 using the cameras 34 is not required.

On the other hand, in the straight body portion where the thickness of the porous glass base material 18 is approximately constant, a control based on the position of the bottom end of the porous glass base material 18 is executed by monitoring by the cameras 34 the marks 33 formed in the weight 30. Therefore, it is desired that the marks 33 are recognized by the cameras 34 adjusting the position of the camera pedestal 35 before the heating by the heating furnace 24 reaches the straight body portion of the porous glass base material 18. The control executed while monitoring the marks 33 by the cameras 34 will be described below.

Figure 5:
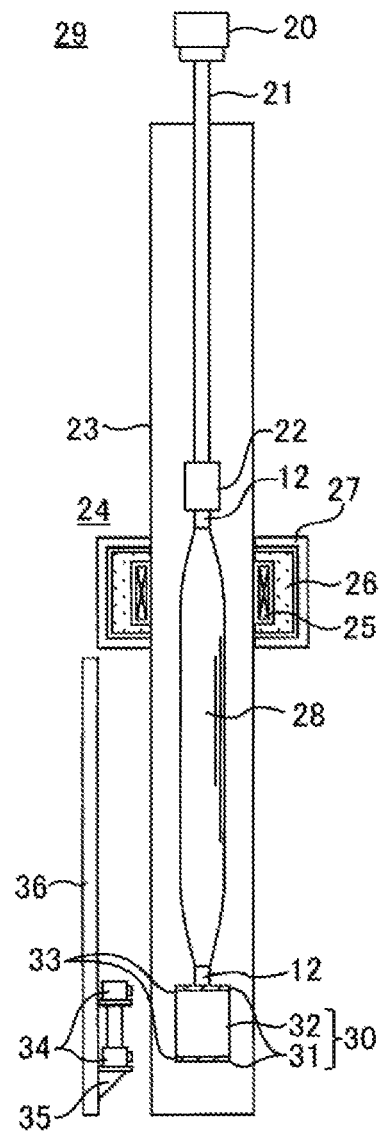
FIG. 5 is a drawing showing an optical fiber base material 28 manufactured using the sintering apparatus 29.

FIG. 5 is a schematic sectional view showing a state where the sintering treatment by the sintering apparatus 29 is finished. In FIG. 5, the same reference numerals are given to the elements common with those in FIG. 3 and FIG. 4, and the overlapping descriptions are omitted.

In the sintering apparatus 29 in the illustrated state, the porous glass base material 18 is sintered with its entire length and becomes the optical fiber base material 28 being a transparent glass. However, a tapered part formed near the upper end of the porous glass base material 18 is a portion that cannot be a product in a case of drawing a fiber. For this reason, at a final step of the sintering treatment by the sintering apparatus 29, the monitoring of the marks 33 using the cameras 34 is not required.

During a series of the sintering treatment by the sintering apparatus 29 as shown in FIGS. 3, 4 and 5, the camera pedestal 35 tracks the weight 30 attached to the bottom end of the porous glass base material 18 and moves along the slide rail 36. Accordingly, one pair of the cameras 34 can continuously capture images of one pair of the marks 33 formed in the boundaries of the carbon plates 31 and the quartz glass cylinder 32 in the weight 30.

By continuously performing measurements of the position of the weight 30 from the top and bottom positions of the camera pedestal 35 and the height positions of the marks 33 in the visual fields of the cameras 34, the movement speed $V_w$ of the bottom end of the glass base material can be calculated. In the sintering apparatus 29 shown in the drawings, an elongation rate $\alpha$ of the porous glass base material can be obtained by a ratio $V_w/V_f$ of a movement speed $V_w$ at the bottom end of the porous glass base material 18 to a feeding speed $V_f$ at the upper end of the porous glass base material 18.

Also, in the sintering apparatus 29, at least one of a temperature of the heating furnace and a feeding speed is controlled such that the elongation rate $\alpha$ measured from the porous glass base material 18 to be sintered matches with a preset target value $\alpha_S$ (L) of the elongation rate. For example, when the measured elongation rate $\alpha$ was less than the target value, it controls to increase the temperature of the heating furnace 24 or decrease the movement speed of the porous glass base material 18 by the carriage 20.

Accordingly, since the softening progresses due to the increased temperature of the porous glass base material 18, the elongation rate $\alpha$ is increased. Here, when the outer diameter of the core rod 11 is constant, the target value $\alpha_S$ (L) of the elongation rate of the core rod 11 portion may be set as a constant value $\alpha_S$ without depending on the feeding distance L. By setting the outer diameter of the core rod 11 constant, it facilitates processes when making a core rod 11 and it can simplify the glass microparticles deposition process.

Furthermore, by setting the target value of the elongation rate greater than 1 and making the porous glass base material 18 to a glass while actively drawing the porous glass base material 18, the porous glass base material 18 can become a transparent glass at a higher temperature. Therefore, the center of the porous glass base material 18 can also be sufficiently transparent.

However, in the porous glass base material 18, regarding the portion which cannot be a product, a different target value may be set if necessary. For methods for controlling the driving of the carriage 20, it can use a feedback control by PID, a table control where a table of deviations and adjustment amounts is prepared in advance for reference, and the like.

Also, the target value $\alpha_S$ of the elongation rate of the porous glass base material 18 can be calculated as shown in the following Expression 1 where an outer diameter of the core rod 11 is represented as $D_T$, a diameter ratio of the core rod 11 portion to the diameter of the porous glass base material 18 is represented as r, a target outer diameter after the porous glass base material 18 becomes a transparent glass is represented as $D_P$.

$$\text{Target value } \alpha_S \text{ of elongation rate} = (D_T \cdot r/D_P)^2 \quad \text{EXPRESSION 1}$$

However, in a case where the outer diameter $D_T$ of the core rod 11 has a distribution in the longitudinal direction, the target value $\alpha_S$ of the elongation rate is defined as a function $\alpha_S$ (L) for the feeding distance L.

Here, when performing a control of the elongation rate $\alpha$ of the porous glass base material 18 adjusting the temperature of the heating furnace 24, it may preset a set furnace temperature $T_0$ (L) for each feeding distance L of the porous glass base material and obtain a temperature deviation $\Delta T$ based on a deviation or a ratio of the measured value $\alpha$ of the elongation rate and the above-described target value $\alpha_S$ (L) to perform the sintering treatment at a furnace temperature set as $T_0$ (L)+$\Delta T$. By setting in advance the set furnace temperature $T_0$ (L) so that the deviation of the measured value α of the elongation rate and the target value $α_S$ (L) becomes less or the ratio of the measured value α of the elongation rate α and the target value $α_S$ (L) is close to 1, the temperature deviation ΔT can be made small and the control stability can be improved.

Furthermore, in a case of controlling the sintering treatment of the porous glass base material 18 adjusting the temperature of the heating furnace 24, when using the porous glass base material 18 with the same shape, the temperature change relative to the feeding distance L is almost the same at any batch. Therefore, by setting the furnace temperature as $T_0$ (L)+ΔT presetting the set furnace temperature $T_0$ (L) for each feeding distance L of the porous glass base material and obtaining the temperature deviation ΔT based on the deviation or the ratio of the measured value α of the elongation rate and the target value $α_S$ (L), it can also appropriately control the portion of both ends of the porous glass base material, where the outer diameter change is large.

On the other hand, when performing the control of the elongation rate adjusting the feeding speed, it is preferable to perform the sintering at a feeding speed set as $V_{f0}$ (L)+$ΔV_f$ presetting a set feeding speed $V_{f0}$ (L) for each feeding distance L of the porous glass base material and obtaining a feeding speed deviation $ΔV_f$ based on a deviation or a ratio of the measured value α of the elongation rate and the target value $α_S$ (L). By setting in advance the set feeding speed $V_{f0}$ (L) so that the deviation of the measured value α of the elongation rate and the target value $α_S$ (L) becomes less, it can decrease the feeding speed deviation $ΔV_f$ and can improve the control stability.

It should be noted that in a case of controlling the sintering treatment adjusting the feeding speed of the porous glass base material 18, when using the porous glass base material 18 with the same shape, similar to the case of the temperature, the feeding speed change relative to the feeding distance L of the porous glass base material 18 is almost the same at any batch. For this reason, by sintering at a feeding speed set as $V_{f0}$ (L)+$ΔV_f$ presetting the set feeding speed $V_{f0}$ (L) for each feeding distance L of the porous glass base material and obtaining the feeding speed deviation $ΔV_f$ based on the deviation or the ratio of the measured value α of elongation rate and the target value $α_S$ (L), it can also appropriately control the tapered part where the outer diameter change is large at the both ends of the porous glass base material 18.

In this way, by controlling the temperature of the heating furnace or the feeding speed so as to match the measured elongation rate α with the target value $α_S$ (L) of the elongation rate, it can keep the outer diameter of the straight body portion of the porous glass base material 18 constant.

First Embodiment

A porous glass base material 18 with an outer diameter of 360 mm was manufactured depositing glass microparticles on a target rod 13 so that a diameter ratio r of a core rod 11 portion to the diameter of the glass base material becomes 0.305 (r=0.305), the target rod 13 with an entire length of 4000 mm including a straight body portion with an outer diameter of 55 mm over the entire field, the core rod 11 with a length of 2000 mm and dummy portions being handles 12. A weight 30, where a quartz glass cylinder 32 with a height of 200 mm and an outer diameter of 200 mm was sandwiched by two pieces of carbon plates 31 with a thickness of 10 mm and an outer diameter of 200 mm, was attached to a bottom end of this porous glass base material 18.

Figure 6:
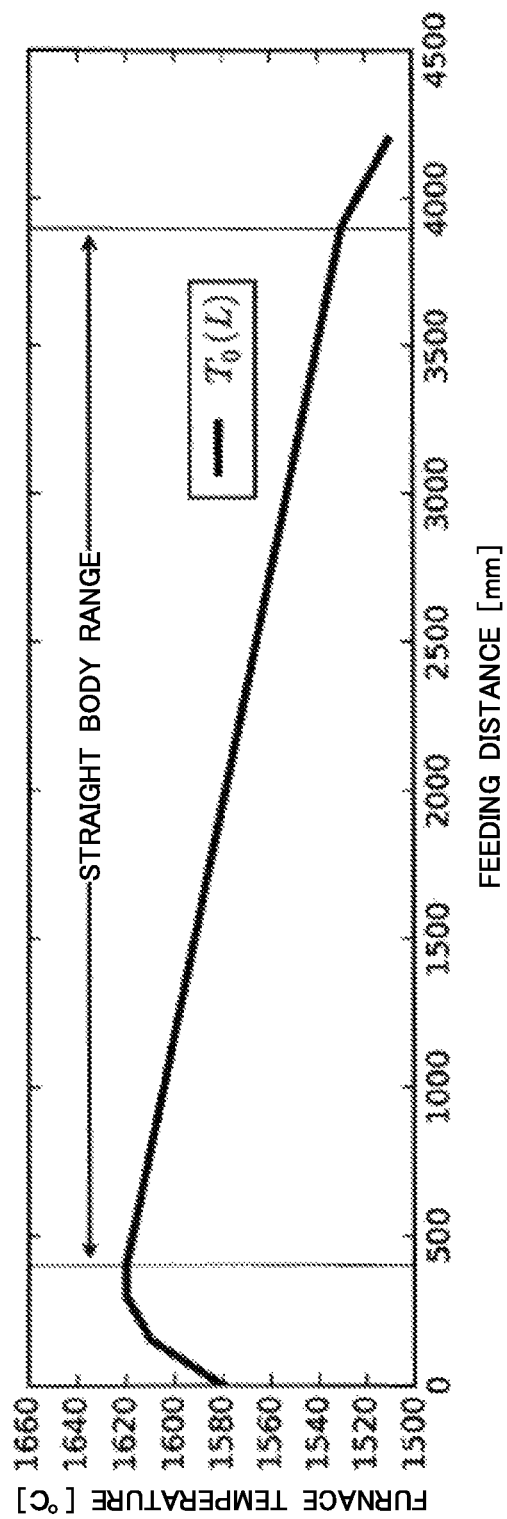
FIG. 6 is a graph showing set values of a furnace temperature in a heating furnace 24.
Figure 7:
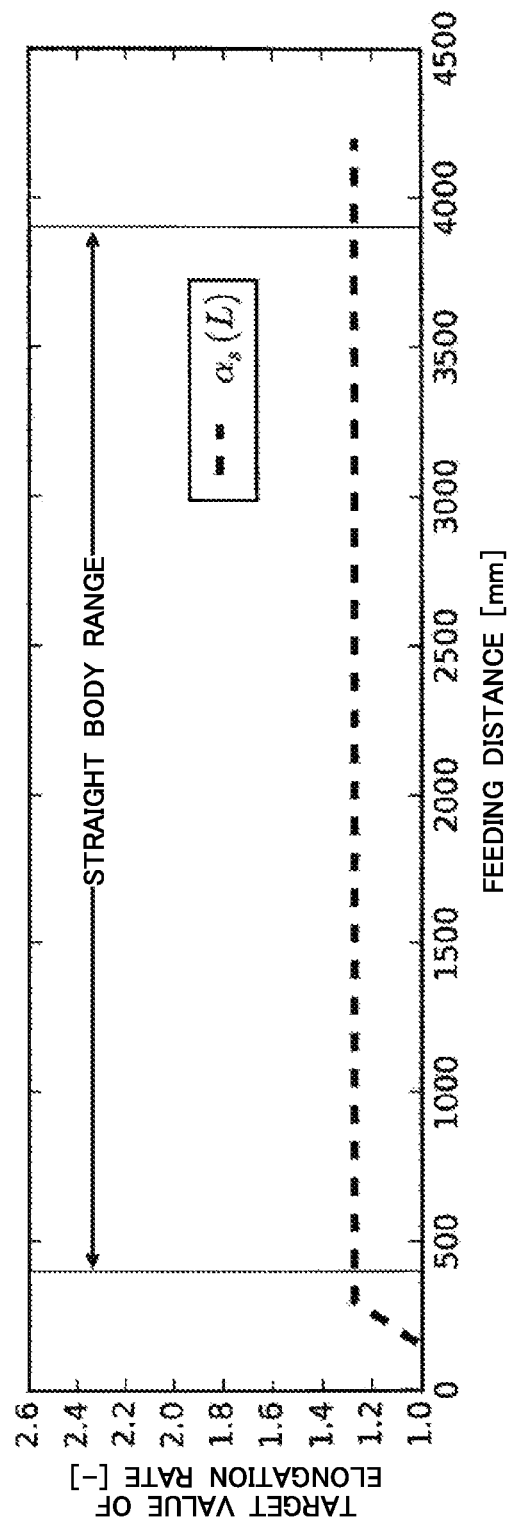
FIG. 7 is a graph showing set target values of an elongation rate of the porous glass base material 18.
Figure 8:
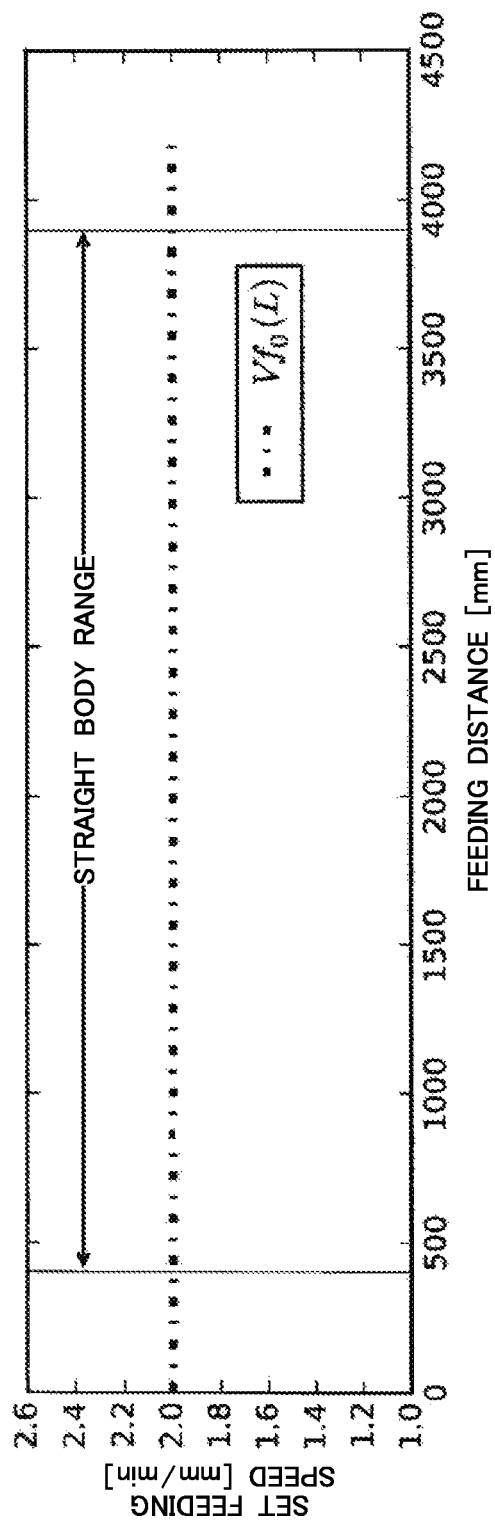
FIG. 8 is a graph showing set values of a feeding speed of the porous glass base material 18.

A sintering treatment was performed setting the above-described porous glass base material 18 in the sintering apparatus 29. FIG. 6 is a graph showing a relation of the set furnace temperature $T_0$ (L) with the feeding distance L (mm) of the porous glass base material 18 during this sintering treatment. FIG. 7 is a graph showing a relation of the target value $α_S$ (L) of the elongation rate of the porous glass base material 18 with the feeding distance L (mm) of the porous glass base material 18 during this sintering treatment. As shown in the drawing, the target value $α_S$ (L) of the elongation rate was set constant. FIG. 8 is a graph showing a relation of the set feeding speed $V_{f0}$ (L) of the porous glass base material 18 with the feeding distance (L) during this sintering treatment. As shown in the drawing, the feeding speed $V_{f0}$ (L) was set constant.

By measuring the position of the bottom end of the glass base material according to the positions of the marks 33 of the weight 30 using the cameras 34, the elongation rate α of the porous glass base material 18 during sintering was measured. Also, based on the deviation between the respective feeding distance L and the target value $α_S$ (L), the temperature deviation ΔT was calculated by PID operation and the temperature of the heating furnace 24 was adjusted as $T_0$ (L)+ΔT.

The difference between the elongation rate α of the straight body portion of the porous glass base material 18 during the sintering and the target value $α_S$ (L) of the elongation rate was 0.020 at most. Also, the distribution range of the outer diameter of the glass base material in the straight body portion of the porous glass base material 18 was 158.7 mm to 161.0 mm and was good. The porous glass base material 18 became a transparent glass in the entire field of the straight body portion and became the optical fiber base material 28 without any problem in appearance recognized.

Second Embodiment

A porous glass base material 18 with an outer diameter of 360 mm was manufactured depositing glass microparticles on a target rod 13 so that a diameter ratio r of a core rod 11 portion to the diameter of the glass base material becomes 0.305 (r=0.305), the target rod 13 with an entire length of 4000 mm including a straight body portion with an outer diameter of 55 mm over the entire field, the core rod 11 with a length of 2000 mm and dummy portions being handles 12. A weight with a shape where a quartz glass cylinder 32 with a height of 200 mm and an outer diameter of 200 mm was sandwiched by two pieces of carbon plates 31 with a thickness of 10 mm and an outer diameter of 200 mm, was attached to a bottom end of this porous glass base material 18.

Setting the porous glass base material 18 attaching the weight 30 in the sintering apparatus 29, the sintering treatment was performed at a feeding speed $V_{f0}$ (L) set constant with the settings as shown in FIG. 6, FIG. 7 and FIG. 8. During the sintering, the position of the bottom end of the porous glass base material 18 was measured according to the positions of the marks 33 in the weight 30 using the cameras 34, and the elongation rate α during the sintering was measured. Also, based on the deviation between the respective feeding distance L and the target value $α_S$ (L) of the elongation rate, the speed deviation $ΔV_f$ was calculated by PID operation, and the feeding speed of the porous glass base material 18 by the carriage 20 was adjusted to $V_{f0}(L)+\Delta V_f$.

The difference between the elongation rate α of the straight body portion of the porous glass base material 18 during the sintering and the target value $\alpha_S$ (L) of the elongation rate was 0.022 at most. Also, the distribution range of the outer diameter in the straight body portion of the porous glass base material 18 was 158.8 mm to 161.3 mm and was good. The porous glass base material 18 became a transparent glass in the entire field of the straight body portion and became the optical fiber base material 28 without any problem in appearance recognized.

In this way, in the sintering apparatus 29, by changing the furnace temperature or the feeding speed in accordance with the feeding distance L of the porous glass base material 18, the outer diameter of the optical fiber base material 28 obtained from the sintered porous glass base material 18 can be stable, and a good transparent state can be kept. In the above-described example, although the control was performed by controlling either the furnace temperature of the heating furnace 24 or the feeding speed by the carriage 20, the control can be performed by controlling changing both of them at the same time.

Figure 9:
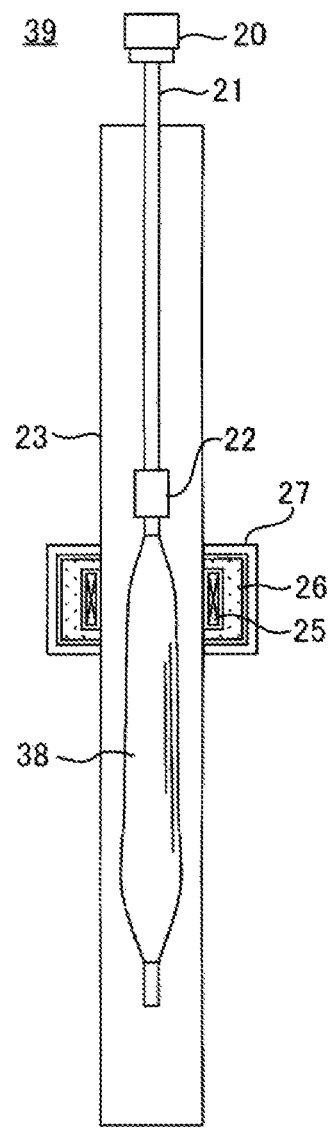
FIG. 9 is a drawing showing an optical fiber base material 38 manufactured using another sintering apparatus 39.

FIG. 9 is a schematic view showing a shape of the porous glass base material 18 sintered using a sintering apparatus 39 not comprising the weight 30, the cameras 34 and the like, without performing the control according to the deviation relative to the target value $\alpha_S$ (L) of the elongation rate as described above. In the sintering apparatus 39, the same reference numerals are given to the elements common with those in the sintering apparatus 29, and the overlapping descriptions are omitted.

In the porous glass base material 18 where a transparent glass progresses due to the heating by the heating furnace 24, a contraction force caused by a surface tension of the welded glass becomes almost constant at any position of the feeding distance L. However, a force that the gravity acting to the porous glass base material 18 where a part is softened or welded draws the porous glass base material 18 depends on a weight of an optical fiber base material 38 presented below the position where the heating furnace 24 heats in the sintering apparatus 39. For this reason, if the measured elongation rate α is not controlled according to the deviation relative to the target value $\alpha_S$ (L) of the elongation rate, as the sintering treatment progresses, an upper part of the porous glass base material 18 becomes thin and an bottom part of the porous glass base material 18 becomes thick.

It should be noted that in a process of transparent glass by sintering, even when the deviation relative to the feeding speed of the porous glass base material 18 is controlled so as to be zero measuring the movement speed of the bottom end of the porous glass base material 18, if the sintering was performed controlling the elongation amount of the porous glass base material 18 to be zero, the temperature of the heating furnace is to be decreased near the upper end of the glass base material. For this reason, in a case of making a larger size of glass base material to a glass, the elongation near the upper end of the porous glass base material becomes greater due to the gravity, and the heating temperature has to be decreased. Therefore, if controlling the temperature so that the elongation amount of the porous glass base material 18 becomes zero, the heating cannot be performed to the heating temperature at which the porous glass base material 18 sufficiently progresses to a transparent glass.

Also, when making a core rod 11 adjusted in advanced over the longitudinal direction to have an outer diameter inverse time of a longitudinal distribution of the elongation amount during the glass process measured in advance, it has to process so as to change the outer diameter of the core rod 11 in the longitudinal direction. Furthermore, it has to adjust the deposition amount of the glass microparticles to meet the outer diameter of the core rod 11. For this reason, the control of the process of the core rod 11 and the OVD process becomes complicated and the productivity of an optical fiber base material is lowered.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A porous glass base material sintering method for making a transparent glass moving a hung-down porous glass base material relatively to a heating furnace and heating the porous glass base material sequentially from one end to the other end, comprising:

measuring a feeding speed $V_f$ of the porous glass base material and a movement speed $V_w$ of a bottom end of the porous glass base material;

presetting, for each feeding distance L of the porous glass base material, a target value $\alpha_S(L)$ of an elongation rate in a straight body portion of the porous glass base material to be greater than one;

presetting, for each feeding distance L of the porous glass base material, a set temperature $T_0(L)$ of the heating furnace;

attaching a weight near the bottom end of the hung-down porous glass base material, the weight acting a tension on the porous glass base material during a sintering treatment, the weight being provided with a plurality of marks on a side surface of the weight, the plurality of marks being arranged spaced apart from each other in the longitudinal direction of the porous glass base material; and performing the sintering treatment of the porous glass base material while controlling a furnace temperature of the heating furnace to be $T_0(L)+\Delta T$, such that a measured value α of the elongation rate of the porous glass base material matches with the target value $\alpha_S(L)$, the measured value α of the elongation rate being calculated as a ratio $V_w/V_f$, and $\Delta T$ being a temperature deviation proportional to an additive inverse of any one of a deviation and a ratio of the measured value α and the target value $\alpha_S(L)$, wherein the porous glass base material has a core rod with a constant outer diameter in a longitudinal direction, with glass microparticles being deposited on an outer periphery of the core rod, and measuring the movement speed $V_w$ of the bottom end of the porous glass base material includes:
obtaining an image by photographing the plurality of marks by a camera tracking the porous glass base material; and
processing the image to calculate the movement speed $V_w$ of the bottom end of the porous glass base material based on a position of the camera and positions of the plurality of marks in the image.

2. The sintering method according to claim 1, further comprising:
setting the target value $\alpha_S(L)$ as a constant value $\alpha_S$ that is greater than 1 regardless of the feeding distance L of the porous glass base material.

3. The sintering method according to claim 1, wherein the mark includes boundaries of a plurality of members in the weight, the boundaries formed and configured by stacking the plurality of members.

4. The sintering method according to claim 1, wherein the plurality of the marks are photographed individually using a plurality of cameras including the camera.

5. A porous glass base material sintering method for making a transparent glass moving a hung-down porous glass base material relatively to a heating furnace and heating the porous glass base material sequentially from one end to the other end, comprising:
measuring a feeding speed $V_f$ of the porous glass base material and a movement speed $V_w$ of a bottom end of the porous glass base material;
presetting, for each feeding distance L of the porous glass base material, a target value $\alpha_S(L)$ of an elongation rate in a straight body portion of the porous glass base material to be greater than one;
presetting, for each feeding distance L of the porous glass base material, a feeding speed $V_{f0}(L)$ of the porous glass base material;
attaching a weight near the bottom end of the hung-down porous glass base material, the weight acting a tension on the porous glass base material during a sintering treatment, the weight being provided with a plurality of marks on a side surface of the weight, the plurality of marks being arranged spaced apart from each other in the longitudinal direction of the porous glass base material; and
performing the sintering treatment of the porous glass base material while controlling a feeding speed of the porous glass base material to be $V_{f0}(L)+\Delta V_f$, such that a measured value $\alpha$ of the elongation rate of the porous glass base material matches with the target value $\alpha_S(L)$, the measured value $\alpha$ of the elongation rate being calculated as a ratio $V_w/V_f$, and $\Delta V_f$ being a feeding speed deviation of the porous glass base material that is proportional to any one of a deviation and a ratio of the measured value $\alpha$ and the target value $\alpha_S(L)$, wherein
the porous glass base material has a core rod with a constant outer diameter in a longitudinal direction, with glass microparticles being deposited on an outer periphery of the core rod, and measuring the movement speed $V_w$ of the bottom end of the porous glass base material includes:
obtaining an image by photographing the plurality of marks by a camera tracking the porous glass base material; and
processing the image to calculate the movement speed $V_w$ of the bottom end of the porous glass base material based on a position of the camera and positions of the plurality of marks in the image.

6. A method comprising:
depositing glass microparticles on an outer periphery of a core rod with a constant outer diameter in a longitudinal direction to form a porous glass base material;
presetting, for each feeding distance L of the porous glass base material, a target value $\alpha_S(L)$ of an elongation rate in a straight body portion of the porous glass base material to be greater than one;
presetting, for each feeding distance L of the porous glass base material, a set temperature $T_0(L)$ of a heating furnace;
attaching a weight near a bottom end of the porous glass base material, the weight acting a tension on the porous glass base material during a sintering treatment, the weight being provided with a plurality of marks on a side surface of the weight, the plurality of marks being arranged spaced apart from each other in the longitudinal direction of the porous glass base material;
moving, while hung-down, the porous glass base material relatively to the heating furnace while heating the porous glass base material sequentially from one end to the other end; and
while moving and heating the porous glass base material:
measuring a feeding speed $V_f$ of the porous glass base material,
obtaining an image by photographing the plurality of marks by a camera tracking the porous glass base material,
processing the image to calculate a movement speed $V_w$ of the bottom end of the porous glass base material based on a position of the camera and positions of the plurality of marks in the image, and
controlling a furnace temperature of the heating furnace to be $T_0(L)+\Delta T$, $\Delta T$ being a temperature deviation determined such that a deviation between a measured value $\alpha$ of the elongation rate of the porous glass base material and the target value $\alpha_S(L)$ is substantially minimized, the measured value $\alpha$ of the elongation rate being calculated as a ratio $V_w/V_f$.

7. The method according to claim 6, wherein $\Delta T$ is a value that is proportional to an additive inverse of any one of a deviation and a ratio of the measured value $\alpha$ and the target value $\alpha_S(L)$.

8. The method according to claim 6, wherein $\Delta T$ is a value that offsets any one of a deviation and a ratio of the measured value $\alpha$ and the target value $\alpha_S(L)$.

* * * * *